(12) United States Patent
Johnson et al.

(10) Patent No.: US 6,270,093 B1
(45) Date of Patent: Aug. 7, 2001

(54) MULTIPLE CHILD SEAT NESTABLE SHOPPING CART

(75) Inventors: Christopher M. Johnson, Richmond; Ralph McCann, Glen Allen, both of VA (US)

(73) Assignee: Rehrig International, Inc., Richmond, VA (US)

( * ) Notice: Subject to any disclaimer, the term of this patent is extended or adjusted under 35 U.S.C. 154(b) by 0 days.

(21) Appl. No.: 09/239,817

(22) Filed: Jan. 29, 1999

(51) Int. Cl.[7] ................ B60N 2/26; B62B 3/14

(52) U.S. Cl. ................ 280/33.993; 280/47.35; 280/47.4; 297/256.17

(58) Field of Search ............ 280/33.991, 33.992, 280/33.993, 33.997, 47.38, 47.35, 47.4, 204, 79.2, DIG. 4; 297/256.17, 248; D34/21, 27; 224/411

(56) References Cited

U.S. PATENT DOCUMENTS

| | | |
|---|---|---|
| D. 281,365 | 11/1985 | Gugler . |
| D. 318,550 | 7/1991 | Stefano . |
| D. 330,103 | 10/1992 | Andrews, Jr. et al. . |
| D. 357,105 | 4/1995 | Reiland et al. . |
| D. 386,873 | 11/1997 | Langlois D'Estaintot et al. . |
| 2,420,088 | 5/1947 | Milburn . |
| 2,508,670 | 5/1950 | Goldman . |
| 2,997,311 | 8/1961 | Unamoff . |
| 3,044,801 | 7/1962 | Vicany . |
| 3,497,234 | 2/1970 | Schray . |
| 3,498,633 * | 3/1970 | Hopkins ............... 280/204 |
| 3,575,250 | 4/1971 | Dykes . |
| 3,834,726 | 9/1974 | Hobza . |
| 3,953,046 | 4/1976 | Johansson . |
| 4,116,456 | 9/1978 | Stover et al. . |
| 4,610,454 | 9/1986 | Gill . |
| 4,650,199 | 3/1987 | Rehrig . |
| 4,706,975 | 11/1987 | Arena et al. . |
| 4,771,840 | 9/1988 | Keller . |
| 4,834,404 * | 5/1989 | Wood .................. 280/33.993 |
| 5,011,169 | 4/1991 | Henderson et al. . |
| 5,076,599 | 12/1991 | Lockett et al. . |
| 5,149,114 | 9/1992 | Lewandowski et al. . |
| 5,176,395 | 1/1993 | Garforth-Bles . |
| 5,188,389 | 2/1993 | Baechler et al. . |
| 5,203,578 | 4/1993 | Davidson et al. . |
| 5,263,726 | 11/1993 | Wood . |
| 5,312,122 | 5/1994 | Doty . |

(List continued on next page.)

FOREIGN PATENT DOCUMENTS

| | | |
|---|---|---|
| 42 02 428 A1 | 6/1992 | (DE) . |
| 42 19 121 A1 | 12/1993 | (DE) . |
| 43 17 228 A1 | 12/1993 | (DE) . |

OTHER PUBLICATIONS

*Shopper's Aid*, Undated Brochure of MART CART advertising dual seat shopping cart.

* cited by examiner

*Primary Examiner*—J. J. Swann
*Assistant Examiner*—David R. Dunn
(74) *Attorney, Agent, or Firm*—McGuireWoods LLP

(57) ABSTRACT

A dual child seat nestable shopping cart including a front overhanging basket, at least two inwardly-facing child seats positioned behind the basket on opposite sides of the cart, each seat having an upright backrest arranged along the opposite sides of the cart, wherein the seats and backrests are positioned such that a front overhanging portion of a basket of a similar cart may be nested over the seat and between the backrests for enabling nesting of similar carts when the seats are unoccupied. The child seats may constitute a portion of a single shopping cart assembly or may be constructed as a module for retrofitting a conventional standard nestable shopping cart.

26 Claims, 7 Drawing Sheets

U.S. PATENT DOCUMENTS

| | | | | |
|---|---|---|---|---|
| 5,330,210 | * | 7/1994 | Lambrecht | 280/33.993 |
| 5,429,290 | * | 7/1995 | Greene, Jr. | 224/274 |
| 5,553,876 | * | 9/1996 | Trubiano | 280/33.991 |
| 5,641,200 | | 6/1997 | Howell . | |
| 5,702,114 | | 12/1997 | Downing et al. . | |
| 5,823,548 | | 10/1998 | Reiland et al. . | |
| 5,848,797 | * | 12/1998 | Paez | 280/33.993 |

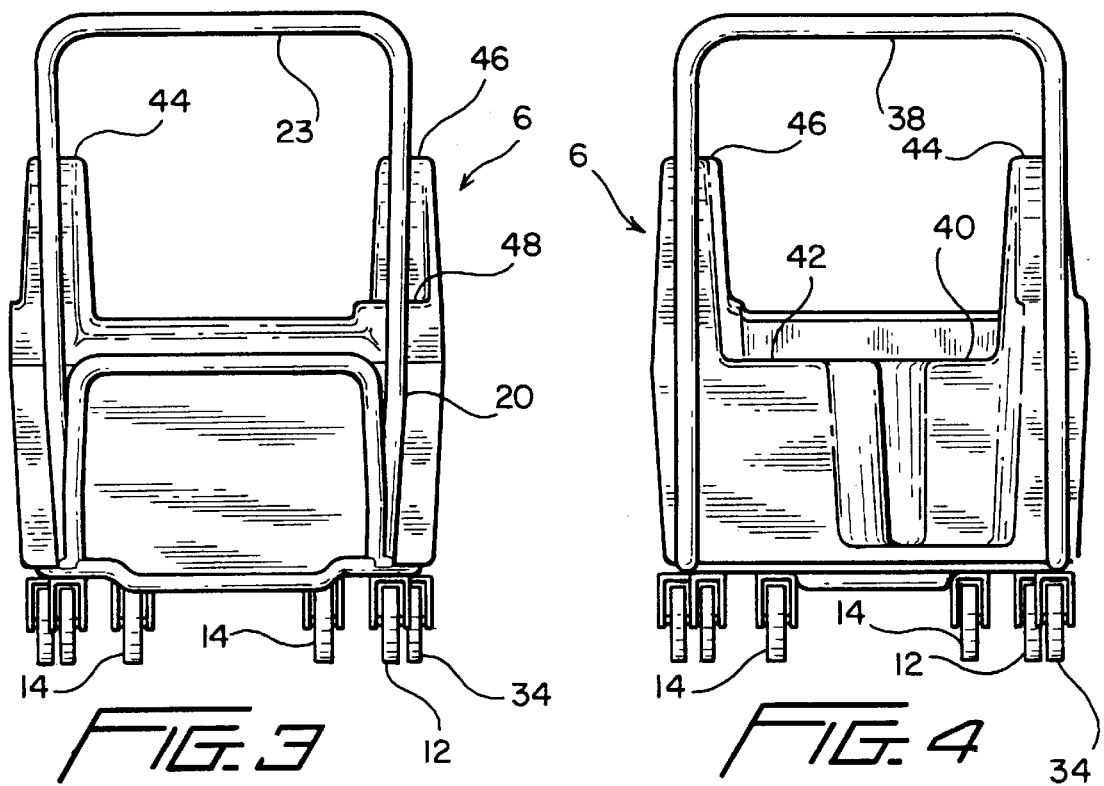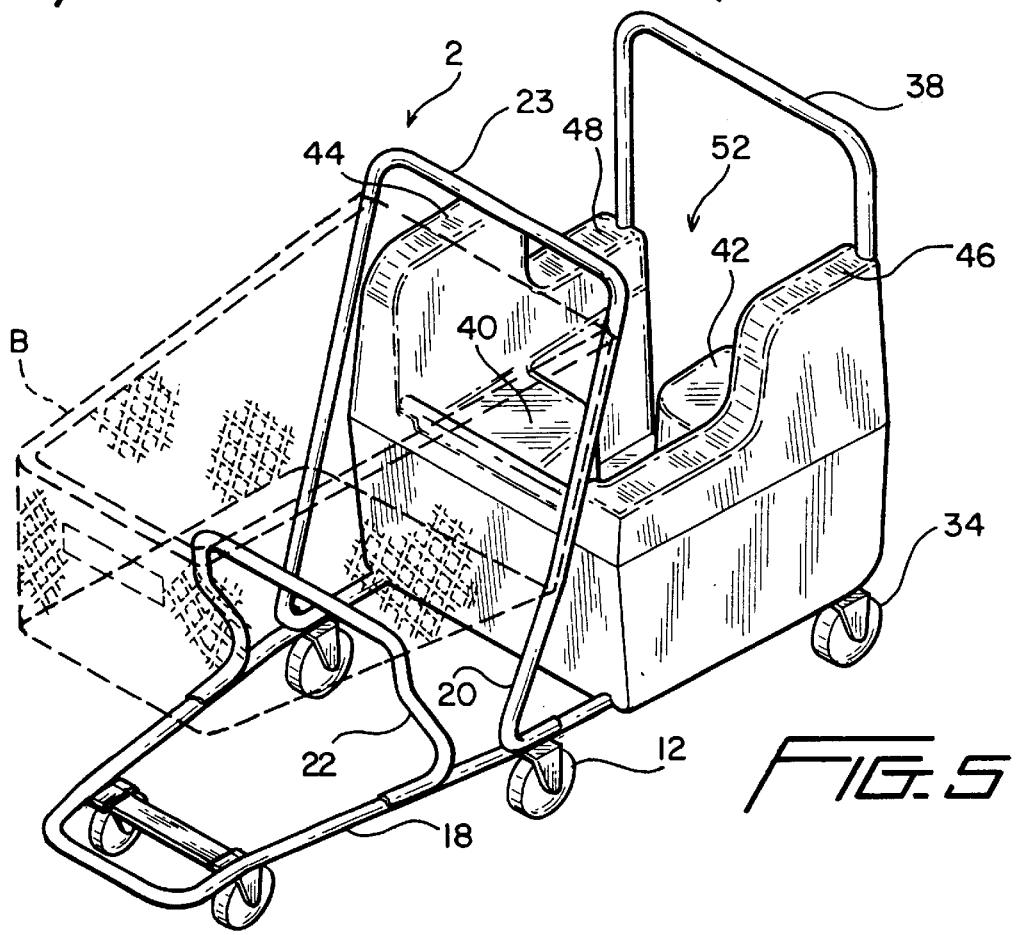

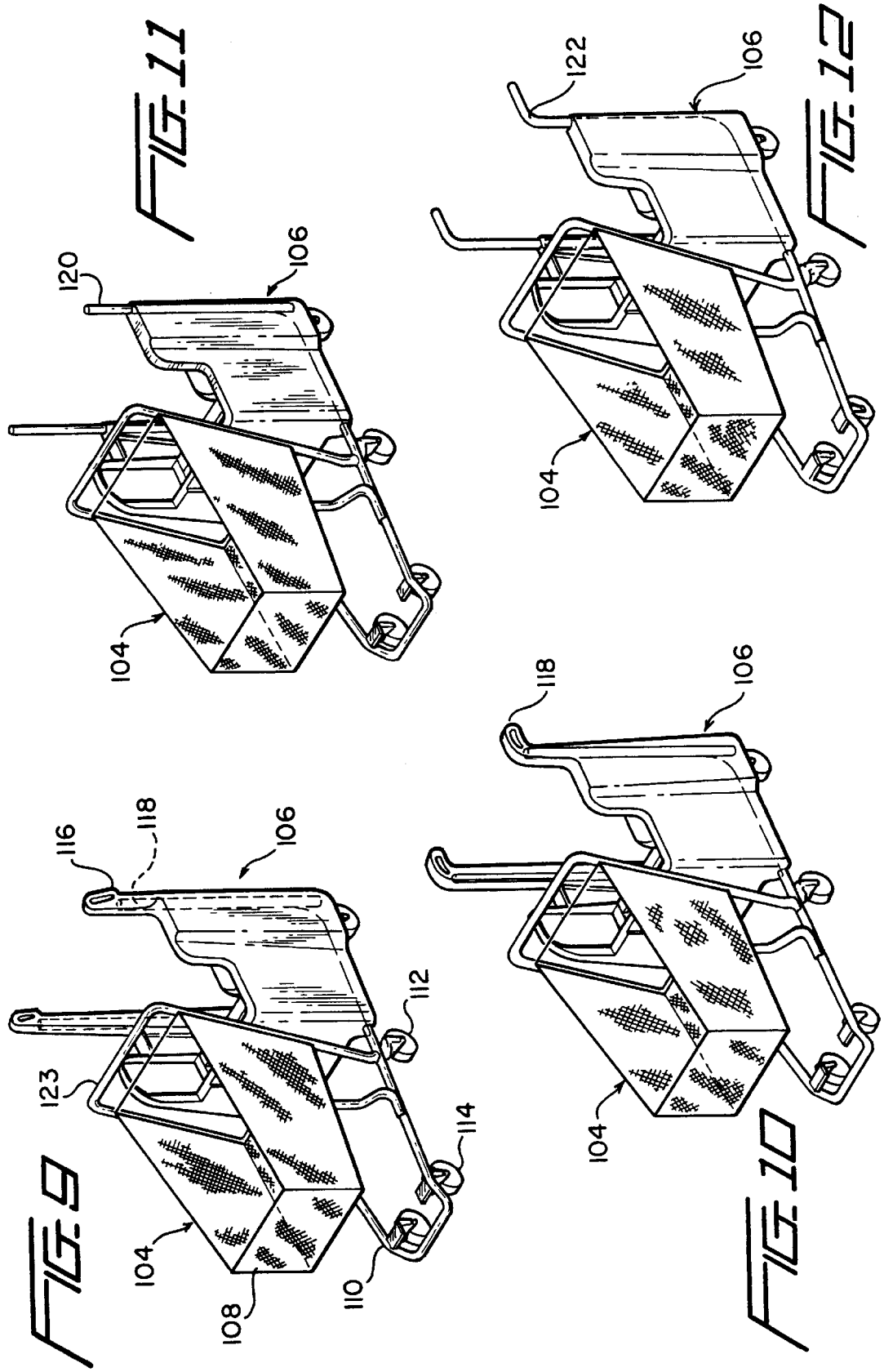

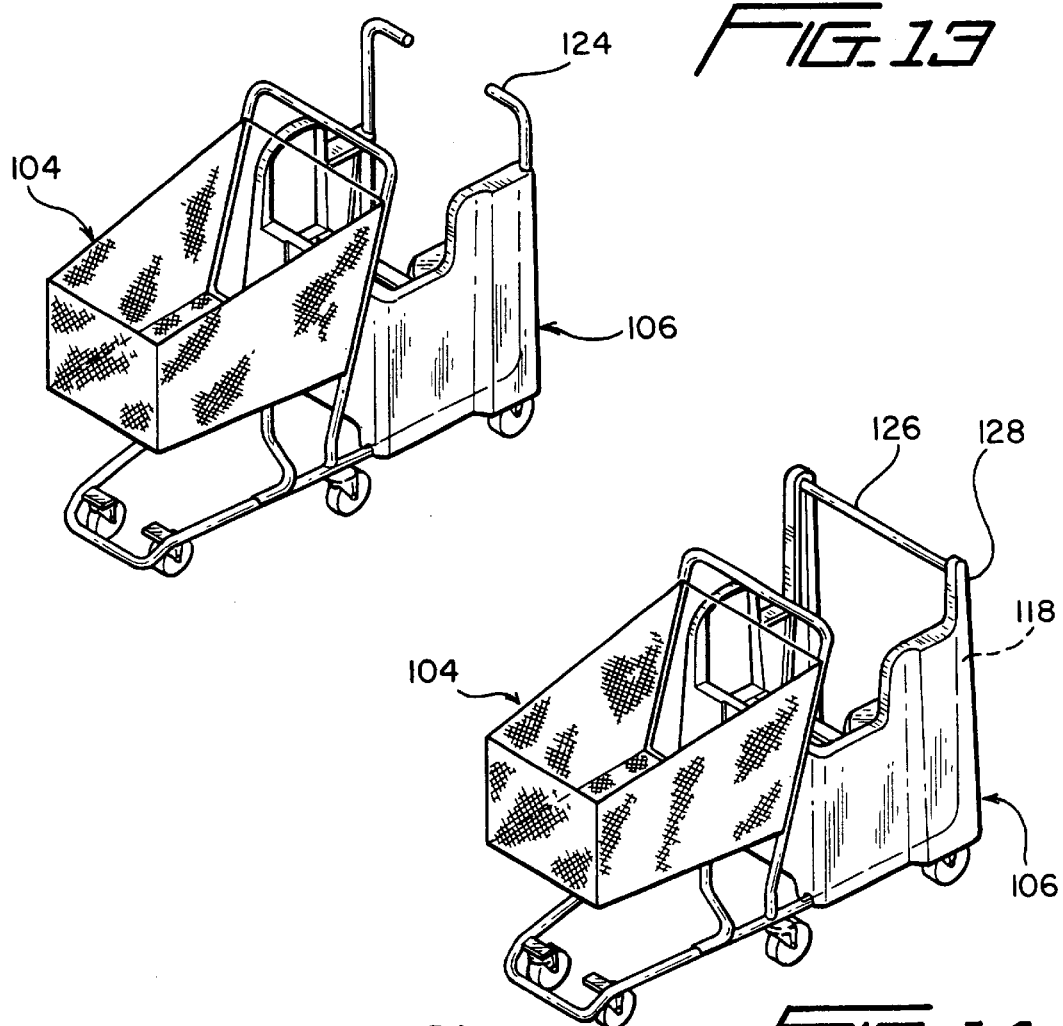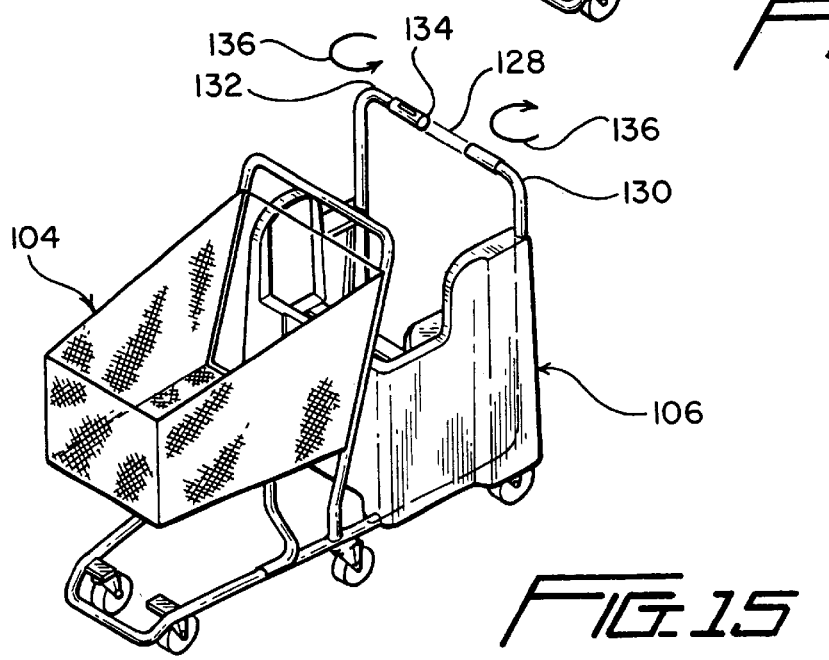

MULTIPLE CHILD SEAT NESTABLE SHOPPING CART

BACKGROUND OF THE INVENTION

1. Field of the Invention

The present invention generally relates to nestable shopping carts more particularly, to a multiple child seat nestable shopping cart.

2. Discussion of the Related Art

Nestable carts are well known for use at supermarkets, department stores, airports, and other environments where the carts are made available on a self-service basis and must be stored while not in use. These carts, in particular, generally include a metal or plastic chassis for supporting a basket having a rear panel that pivots upward upon being engaged by the front portion of a similar basket on another cart. The basket in the second cart can then be fitted inside, or "nested," within a rear portion of the basket of the first cart so that numerous carts can be neatly and compactly arranged facing front-to-back in a single line. One such cart is disclosed in U.S. Pat. No. 5,458,347 to Chiv which is hereby incorporated by reference. However, a variety of other cart designs, such as luggage carts, may also be nestable.

In conventional nestable carts, a foldable child seat is often added to the rear panel of the basket. In one common arrangement for such a foldable seat, the back support panel of the seat is pivotally attached to the chassis near the bottom of the rear basket panel. A fold down seat panel then traverses the back support panel and the rear basket panel to form a child seat inside the basket near the upper portion of the rear basket panel. Generally, the child seat is arranged so that the child's torso is inside the basket while the child's legs extend through openings in the back panel.

Such child seats generally have room for only one child. Furthermore, as children grow, these child seats are confining and uncomfortable for the child, often resulting in restless behavior.

Numerous patents disclose shopping carts with dual child seats for allowing a second child to ride somewhere other than in the basket or on the frame. For example, U.S. Pat. No. 5,702,114 to Downing et al. discloses a shopping cart having two child seats, arranged side-by-side, facing backwards in the basket portion of the cart. However, such carts have to be extremely wide in order to accommodate larger children and the seat portion of these carts often takes up a significant amount of space in the basket. Moreover, it is difficult to keep the children separated from each other in order to reduce annoying bickering.

U.S. Pat. No. 5,312,122 to Doty discloses a shopping cart attachment which allows two children to ride backwards, facing front to back, with only one child taking up space inside the basket. Although the Doty device addresses the problem of excessive cart width, it creates a new problem where the child in the rear seat can be easily taunted by, but can not see or defend against, the other child in the seat behind him. This arrangement also does not allow either child to see where the cart is going.

Since the foldable child seats in lighter weight carts are generally located at the upper portion of the rear panel of the basket, a heavy child who is seated in the foldable seat will significantly (and perhaps unexpectedly to a user who is unfamiliar with the lighter-weight carts) raise the center of gravity of the cart, especially when the rest of the basket is empty or the child attempts to stand up.

U.S. Pat. No. 3,044,801 to Vicany discloses a cart with a single, lower, front-facing seat extending across the rear width of the cart for providing a lower center of gravity. However, it can be difficult to accommodate two large children in such an arrangement for the same reasons as noted above with regard to the side-by-side arrangement in Downing et al. In addition, both Downing et al. and Vicany disclose seating areas in which a portion of the child's body is not protected by the structure of the cart.

Due to the large number of shopping carts currently in use, an economically viable approach to multiple child carrying carts will utilize this existing inventory of carts without significantly reducing their overall functionality. For example, U.S. Pat. No. 5,823,548 to Reiland et al. discloses a multiple child carrier accessory which attaches to an existing shopping cart using a large and cumbersome mounting bracket. The device includes a carrier body with left and right forward-facing seat areas and a center divider which generally prevents the riders from interacting. Although children in this carrier are somewhat protected by the side support portions formed in each seat, their legs and feet are still not protected. Moreover, the seats in the carrier accessory are arranged at approximately the same height as the foldable seat in the basket and thus may significantly raise the overall center of gravity for the carrier and cart when occupied.

Another challenge encountered by the designer of a multiple child seat shopping cart is how to maintain the nesting relationship between carts when a multiple child seat is provided at the rear area of the cart. For example, while an auxiliary unit located behind the main shopping cart basket might present a practical approach to providing multiple child seats for a shopping cart, such an auxiliary unit would need to enable some form of nesting between similar shopping carts to minimize storage space required for idle carts.

BRIEF SUMMARY OF THE DISCLOSURE

The invention disclosed here generally relates to a dual child seat nestable shopping cart including a basket mounted on a wheeled chassis or frame and having a forwardly projecting front portion, and at least two inwardly facing child seats positioned behind the basket on opposite sides of the centerline of the cart. Each seat has an upright back rest arranged along opposite sides of the cart and a rear handle for maneuvering the cart. The cart also includes a rear opening for allowing a child to access the seats and for at least partially receiving the front portion of a basket of a similar cart over the seats and between the backrests. One of the two seats may be closer to the rear of the cart basket than the other seat and the two seats may also be longitudinally spaced apart from each other. The cart may also include a horizontal floor extending between opposite sides of the cart in front of, and between, the two seats.

In another embodiment, the cart includes a wheeled basket module, a wheeled seat module arranged behind the basket module for supporting at least one child upright and facing sideways with the child's legs arranged substantially inside the seat module, and a rear opening in the seat module for receiving at least a part of the front portion of a similar basket module of another cart for nesting purposes. A rear edge of the seat is preferably arranged along a side of the seat module and the seat may also include a backrest arranged along that side edge of the seat. This embodiment may also include a second seat having a rear edge arranged along an opposite side of the seat module from the other seat and both laterally and longitudinally spaced apart from the other seat. Each of the seats preferably includes a backrest arranged along the side of the seat module.

The basket module may include a wheeled chassis and the seating module may include a separate seating module wheeled chassis so that the two chassis can be joined by any appropriate connecting device. In particular, the connecting device may include a bracket assembly with, for example, a plate, at least one pin having one end secured to the plate and another end secured to said seating module chassis, and at least one bracket for securing the plate to the shopping cart chassis. The pins and brackets also preferably include threads for being secured with nuts. However, any other securing means known to those skilled in the art may also be used.

In yet another embodiment, the multiple child seat nestable shopping cart includes a wheeled shopping cart having an overhanging, forward projecting basket, and a wheeled seating module retrofitted behind the conventional shopping cart. The seating module has a floor and at least two spaced-apart inwardly-facing seats with backrests arranged on opposite sides of the module. Each of the seats has a backrest arranged along the opposite sides of the seating module and a handle at the rear end of the seating module. An opening is provided at the rear end for at least partially receiving the front end of another basket between the two backrests on opposite sides of the seating module.

The cart and seating module may be joined together in a variety of ways, such as with a bracket assembly. In one embodiment, the bracket assembly includes a plate, a pair of pins having one end secured to the plate and another end secured to the seating module, and a pair of brackets for securing the plate to the shopping cart. The pins may include threads at one end for engaging a nut that secures the seating module to the bracket assembly and the brackets may also include U-bolts for engaging other nuts that secure the plate to the conventional shopping cart. The disclosure also describes a simple bracket assembly for retrofitting a shopping cart with a conventional rear module which includes these features.

The seating module in accordance with this invention is intended to be entered from the rear of the module and various cart maneuvering handle arrangements may be utilized which permit entrance and egress to and from the seats of the seating module or access to the seats by a parent placing a child or children in the module. The handle arrangements permit nesting of similar carts while maintaining their function as cart maneuvering devices.

BRIEF DESCRIPTION OF THE DRAWINGS

FIG. 3 is a front view of the cart of FIG. 1 with the basket and bracket assembly omitted;

FIG. 4 is a rear view of the cart of FIG. 1 with the basket and bracket assembly omitted;

FIG. 5 is a front perspective view of the cart shown in FIG. 1 with the bracket assembly omitted;

FIGS. 9–15 schematically illustrate several exemplary embodiments of handle arrangements that may be utilized for the seating module in accordance with this invention.

DETAILED DESCRIPTION OF THE PREFERRED EMBODIMENTS

Figure 1:
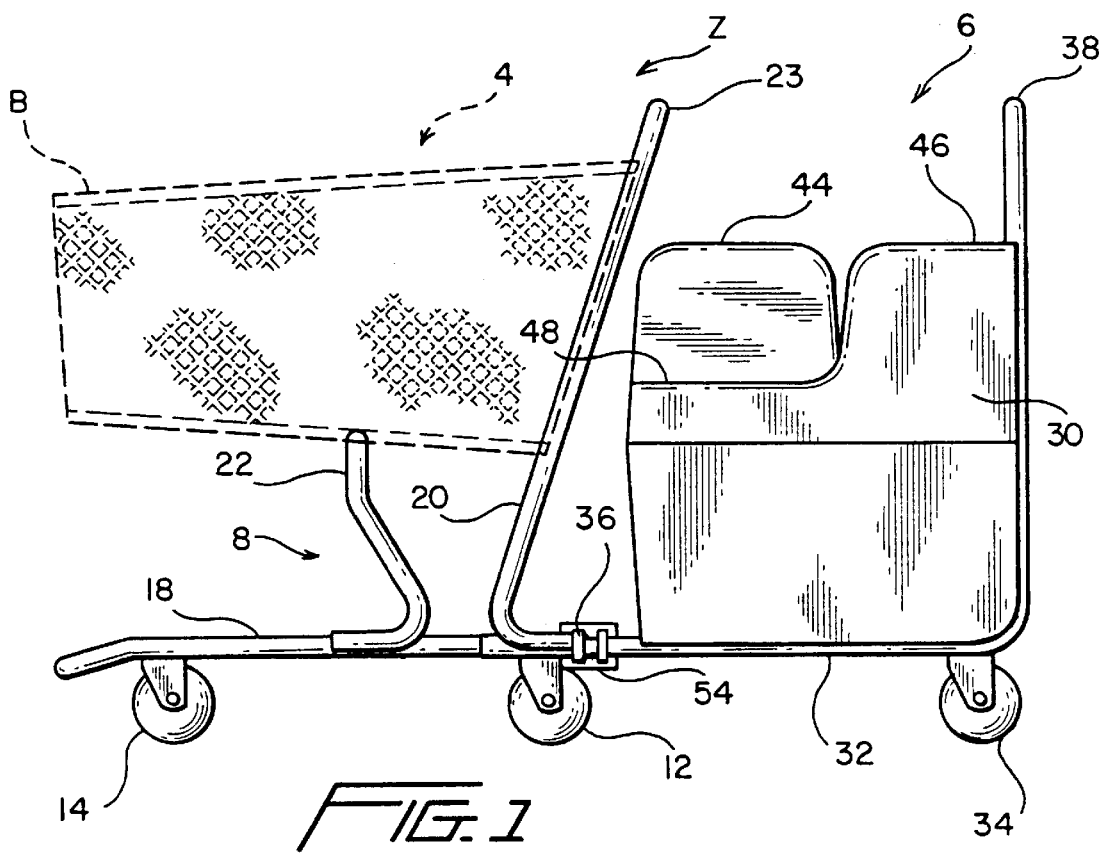
FIG. 1 is a side elevation view of one embodiment of a dual child seat nestable shopping cart.
Figure 2:
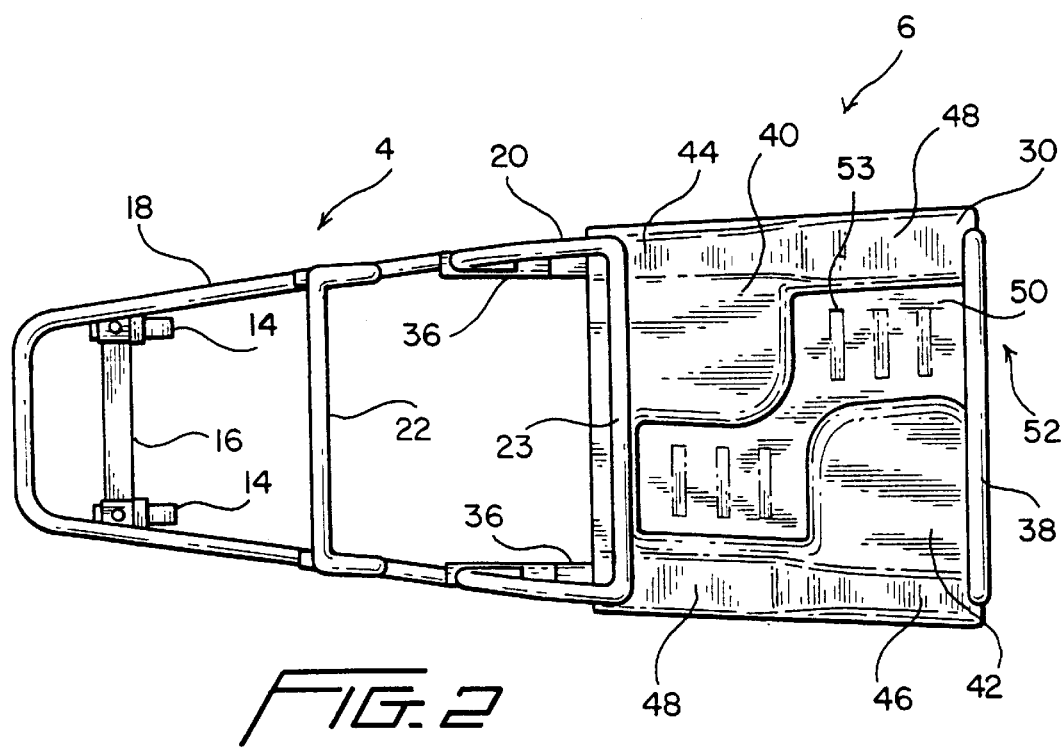
FIG. 2 is a top view of the cart of FIG. 1 with the cart basket and connecting bracket assembly omitted.

FIGS. 1–5 illustrate several views of one embodiment of a multiple child seat nestable shopping cart 2. The cart 2 includes a basket portion, or module, 4 and a seat portion, or module, 6. The basket module 4 is also referred to as a "cart module" or "cart portion." The basket module 4 generally includes a basket 8 (shown in dashed lines in FIG. 1 and omitted from FIGS. 2–5) which is supported in an overhanging, forwardly projecting position by a basket module chassis 10 mounted on middle wheels 12 and front casters 14.

The front casters 14 are rotatably mounted on a caster support member 16 which is secured to a bottom chassis member 18. Although the front casters are shown on the right and left sides of the caster support member 16, a single caster may be used near the center of the caster support member 16, or near the center of the front portion of the bottom chassis member 18. The middle wheels 12, which may also be casters, are shown as being secured to the bottom of the bottom chassis member 18 on right and left sides of the shopping cart 2. However, a middle wheel support member similar to the caster support member 16 may also be used.

The basket 8 is supported by a rear chassis member 20 and a center chassis member 22. The basket 8 is preferably made of a lightweight molded plastic material as disclosed in U.S. Pat. No. 3,999,774 to Rehrig; U.S. Pat. No. 4,650,199 to Rehrig; U.S. Pat. No. 4,865,338 to Rehrig; and/or U.S. Pat. No. 4,946,059 to Rehrig; which are all hereby incorporated by reference. Bumpers and advertising panels may also be provided on the basket as disclosed in U.S. Pat. No. 5,458,357 to Chiv; U.S. Pat. No. 4,922,639 to Rehrig; U.S. Pat. No. 5,111,604 to Rehrig; U.S. Pat. No. 5,210,968 to Rehrig; and/or U.S. Pat. No. 5,331,756 to Rehrig; which are also hereby incorporated by reference. In addition, the basket module 4 may also include a conventional foldable child seat (not shown) inside the basket 8 similar to those disclosed in U.S. Pat. No. 4,176,849 and U.S. Pat. No. 4,065,142 to Rehrig which are hereby incorporated by reference. The basket 8, and any child seat arranged inside the basket (not shown), may also be formed from metal or other suitable materials.

The basket module chassis 10 is preferably formed from a tubular metal frame, as shown in the Figures, or a reinforced plastic structure, such as disclosed in U.S. Pat. No. 4,746,134 to Rehrig which is hereby incorporated by reference. Other chassis structures may also be used. A handle portion 23 is arranged at the top of the rear chassis member 20. When separated from the seat module 6, the basket module 4 may be nested with another similar basket module 4 (not shown) via a rear opening when the back panel (not shown) is rotated upward when the front of the second basket module is pushed into the opening.

The seat module, or seating module, 6 includes a seat body 30 which is supported by a seat module chassis 32. One or more rear wheels 34 rollingly support the seat module chassis 32 which is fixedly connected to the basket module chassis 10 preferably by a connector device or joint 36, as shown in FIG. 1, or integrated rigidly and permanently with the chassis member 18 as shown in FIG. 5, wherein a separate connector is not used, For example, an extension of the chassis member 18 could be used to form the seat chassis 32 and to support the seat body 30 or a separate seat body chassis member 32 could be welded to the basket chassis member 18 to form a rigid, unified basket and child seat assembly. In a preferred embodiment, the rear wheels 12 are castered for providing good maneuverability of the cart 2 if the middle wheels 12 are not casters.

The connector 36 may be rigid, rotatable in a substantially horizontal plane, or slidable along the length of the bottom portion of the chassis 10 and 32. However, in a preferred arrangement, the connector 36 is a rigid connection with very little space, if any, left between the basket module 4 and the seat module 6 in order to prevent children from climbing in or out over the front wall portion of the seat module. The chassis 32 of the seat module could be integrally formed of reinforced molded plastic material as a single integrated unit with the seat body 30, if desired.

The seat module chassis 32 may include a seat handle portion 38 which is preferably arranged higher than the highest portion of the basket 8 on the basket module 4 in order to allow another basket 8 of a similar cart 2 (not shown) to fit under the handle 38 during nesting as described in more detail below. For example, the handle portion 38 on the seat module chassis 32 may be arranged at about the same level as the handle portion 23 on the rear chassis member 20. The handle portion 38 allows an operator to push and steer the cart 2 and may be hinged, or otherwise configured, for moving out of the way (not shown) during nesting, for example as illustrated in FIGS. 9–15 to be discussed below.

The seat body 30 is preferably formed from a unitary molded plastic material with two child seats 40 and 42 that face inwardly toward each other, that is, towards the central longitudinal axis or area of the shopping cart 2 as shown in the Figures. The seats 40 and 42 are generally arranged lower than the front overhang portion of the basket 8 in front of the chassis member 22 so that at least the front portion of a similar basket of another cart 2 (not shown) will slide under the handle 38 and over the seats. For a second cart 2 (not shown) with a longer basket 8, a portion of the longer basket could nest inside the basket of the first cart 2.

The seats 40 and 42 may also be arranged substantially lower in order to accommodate carts with lower baskets or to maintain an even lower center of gravity for the cart 2 when larger children are sitting in the seats. Preferably, the seats 40 and 42 are lower than any foldable seat (not shown) that is arranged in the basket 8 so that the larger children sitting in the seats 40 and 42 will tend to compensate for changes in the center of gravity for the cart 2 when a child is also seated in any foldable seat (not shown) inside the basket 8.

Although the seats may be any practical size, each seat 40 and 42 is preferably large enough to support a child in an upright seated position facing sideways relative to the cart with the child's legs inside the cart. In this regard, each of the seats 40 and 42 is provided with a backrest 44 and a backrest 46, respectively, on opposite sides of the cart 2. The backrests 44 and 46 are preferably wide enough and high enough to protect a seated child's back, arms, shoulders, neck and head from a side collision, and, in particular, a side collision from another cart 2.

Figure 16:
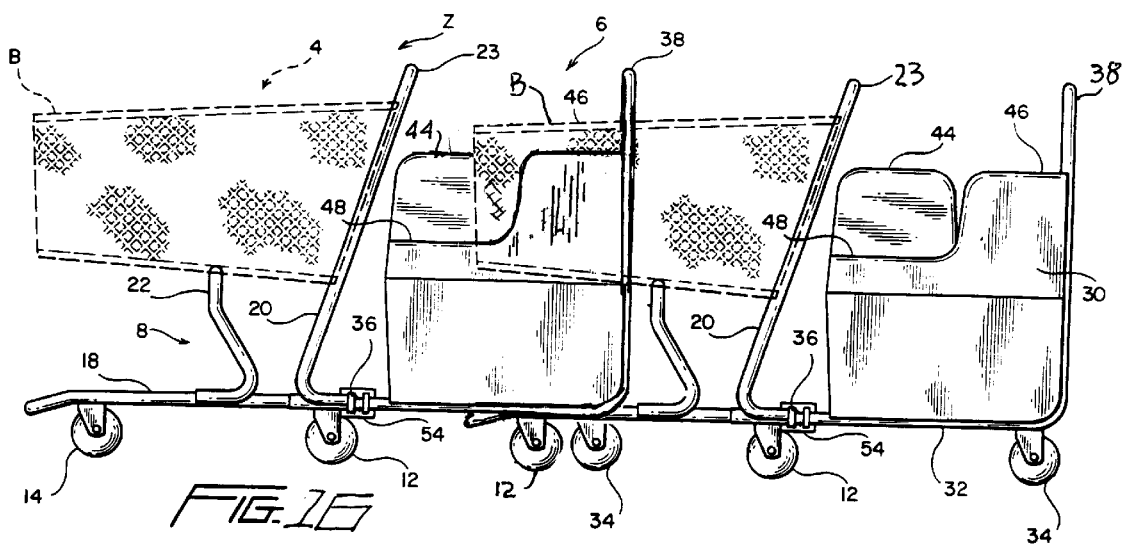
FIG. 16 illustrates dual child seat carts in nested relationship.

The backrests 44 and 46 are also preferably wide enough apart on either side of the cart longitudinal axis, across the width of the cart 2, so as to be able to receive at least a front portion of a basket on a second similar cart 2 (see FIG. 16) between the backrests 44 and 46. Also, the width of the seating module 6 is preferably about the same width as the rear end of the basket module 4 for ease of maneuverability and storage. However, the seat body 30 may be designed for practically any width or length. The seats and backrests may also include padding (not shown) and restraints (not shown) for comfortably securing children into the seats.

The side walls of the seat body 30 are provided with recessed side portions, or recesses, 48 next to the right and left backrests 44 and 46. These recesses provide an unobstructed view for the child sitting in the seats 42 and 44 across from each recess 48. The unobstructed view provided through the recesses helps to encourage children in the seat module 6 to stay seated while the cart is in motion and yet still provides protection against side-impact collisions. The right and left seats 40 and 42 and the right and left backrests 44 and 46 may also extend along the entire length of the seat module 6 in order to create two side-by-side benches with room for four, or more, children. However, with such a two-bench arrangement, the width of the seat module 6 may need to be increased in order to provide adequate leg room for the children sitting directly across from each other. A floor surface 50 extends below and between the seats 40,42, and serves as a footrest area as well as a support for a child or children entering and exiting the seat body.

Both the two-seat arrangement shown in the Figures, and the two-bench arrangement discussed above may also include backrests, or walls (not shown), which extend along the entire length of both sides of the seat body 30 and fully enclose both sides of the seat module 6 in order to provide additional side-impact protection to the children. However, such full-length backrests (not shown) should be provided with openings, or windows, for allowing children to see outside the cart without standing up. The openings may also be decorative in appearance.

During normal use, a child may simply climb into the rear of the seat body 30 through a rear entrance 52 under or around the seat handle 38 and opposite of the rearward seat 42. The rear entrance 52 may also be used for easily sweeping out, wiping or hosing down the inside of the seat module 6 and is preferably provided with safety ribs 53 or other surface features to prevent slipping. Although the entrance 52 is general shielded by the body of the adult who is pushing the cart 2 with the handle 38, an additional gate (not shown), or other restraint, may be provided in the entryway 52. Similar passages and/or gates may also be provided on the sides of the seat module 6 at the recesses 48. Any such rear wall or gate in the body 30 may also extend as high as the backrests 44 and 46 and/or across the entire length of the seat module 6. A similar taller front wall may also be provided in the seat module 6.

Figure 6:
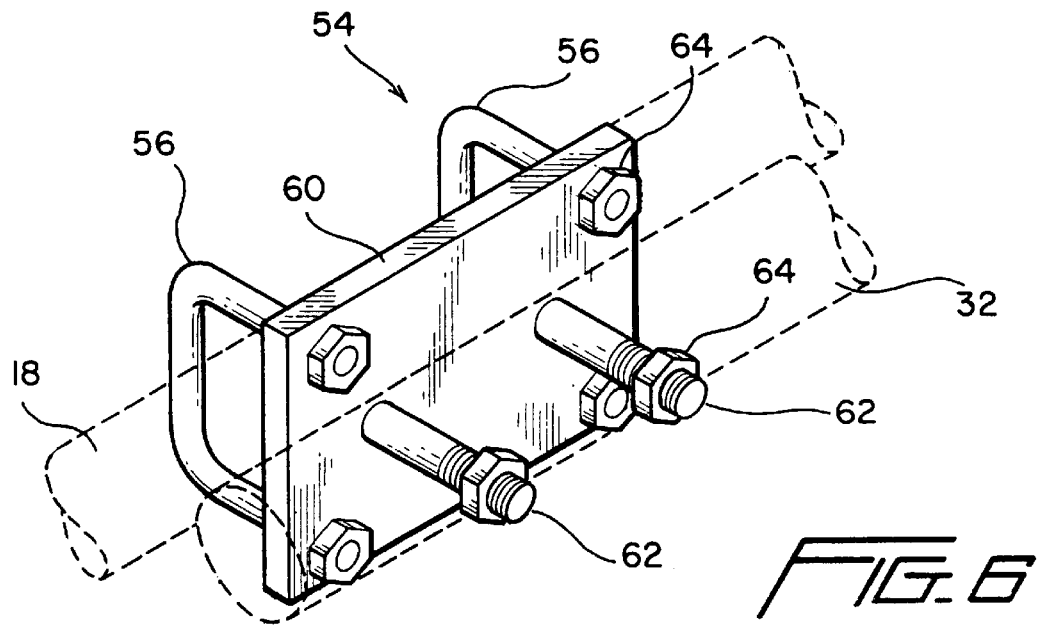
FIG. 6 is a side perspective view of the bracket assembly shown in FIG. 1.
Figure 7:
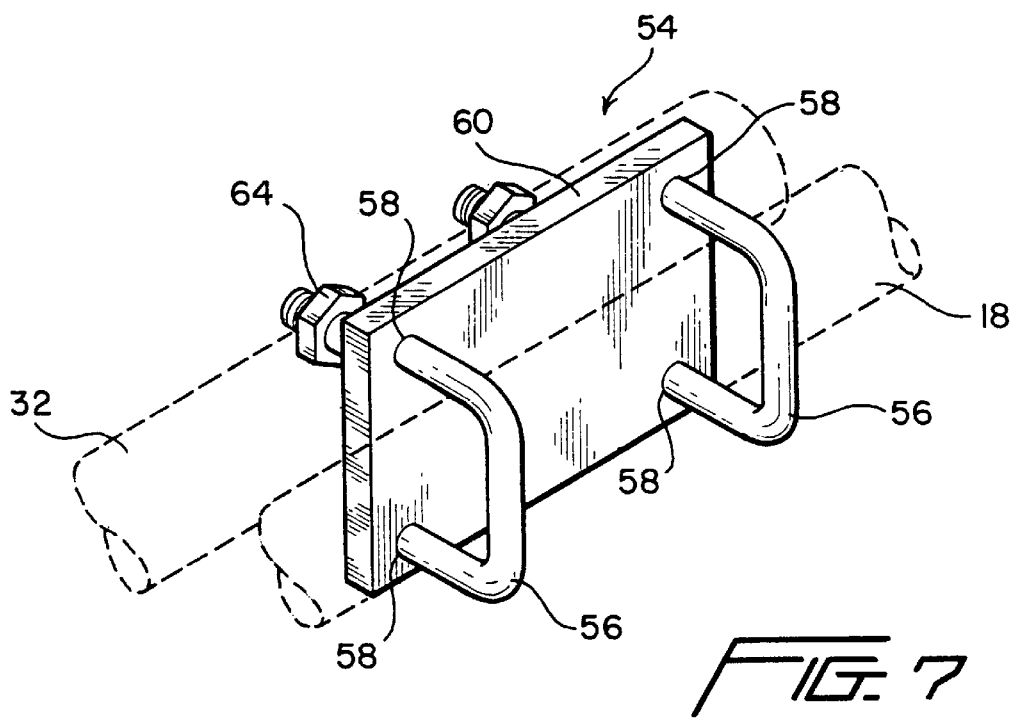
FIG. 7 shows the opposite side of the bracket assembly.

FIGS. 6 and 7 show an exemplary bracket connector assembly 54 for removably connecting an existing conventional shopping cart constituting the basket module 4 with a seat module 6 for wheeled motion together. In FIGS. 6 and 7, the bottom chassis member 18 of the conventional shopping cart 4 is arranged substantially parallel to one side of the seat module chassis 32. Two U-shaped bolts 56 extend around the bottom chassis member 18 and have ends extending through the holes 58 in a plate 60. The plate 60 also includes studs 62 which are securely mounted on the plate at one end, for example, by welding or bolting. The other ends of the studs 62 extend through holes (not shown) in the seat module chassis 32. In a preferred embodiment, the free ends of the U-bolts 56 and studs 62 are threaded to receive nuts 64 for holding the plate 60 on the U-bolts 56 and the seat module chassis 32 on the pins 62. However, other means for securing the bracket assembly 54, such as welding, riveting, or cotter pins, may also be used. The holes 58 may be also replaced with slots for allowing the plate 60 to be adjusted in the vertical and/or horizontal directions.

Figure 8:
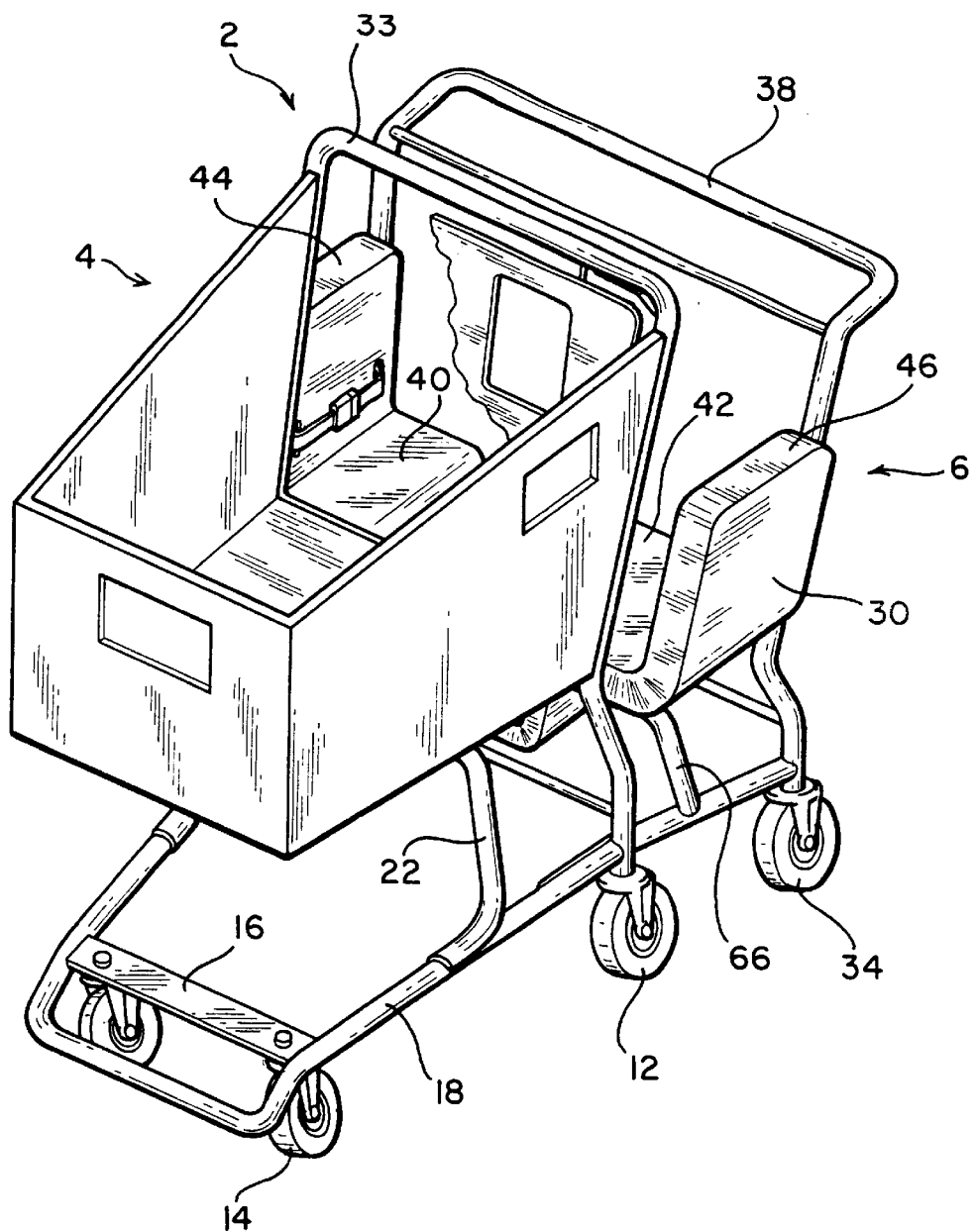
FIG. 8 is a perspective view of an alternative embodiment of a dual child seat nestable shopping cart.

FIG. 8 is an isometric view of an alternative embodiment of a dual child seat nestable shopping cart. In FIG. 8, the seats 40 and 42 are arranged directly across from each other in the seat module 6 and are supported by a seat chassis member 66.

Other handle arrangements for the seating module are illustrated in FIGS. 9–15, which are intended to be exemplary.

With reference to FIG. 9, a typical basket module 104 including a basket 108, chassis 110, wheels 112, 114 and pushing handle 123 is connected to a seating module 106 in the manner described previously in connection with FIGS. 1–8.

The seating module 106 in this embodiment includes maneuvering handles 116 that may comprise molded plastic surrounding metal or other rigid reinforcing posts 118 molded into the rear lateral sides of the seating module. The handles 116 provide individual grips for maneuvering the cart while leaving the rear of the seating module completely open to receive children in the seating areas or a nesting cart between the upright backrests of the seats.

In FIG. 10, the handles 118 are shown as curving rearwardly to provide a horizontal gripping area for maneuvering the basket and module assembly and to reduce the vertical height of the assembly.

In FIG. 11, the handle elements are shown as vertical posts 120 which may incorporate reinforcing elements in the same manner as previously described in connection with FIG. 9. All of the handle arrangements illustrated throughout the drawings may include appropriate reinforcing elements located towards the rear of the respective seating modules.

In accordance with FIG. 12, the handles 122 shown in FIG. 11 may be arched or bent over to provide better gripping areas for the assembly and to reduce the vertical height of the handles of the module.

In accordance with the embodiment illustrated in FIG. 13, the handle elements 124 may be curved inwardly towards the longitudinal centerline of the cart module 104 while leaving a gap between the ends of the handles to permit seating of a child or children and nesting of a similar cart and seating module assembly.

In accordance with the embodiment illustrated in FIG. 14, the handle 126 of the seating module may comprise a single bar spanning vertical upright sections 128 located at the rear end of the seating module, the upright sections 128 surrounding vertical reinforcing rods or posts described previously with reference to FIG. 9.

In FIG. 15, the handle arrangement for the seating module 106 includes a pair of pivoting handle portions 130, 132 and a slidable connector element 128 that spans the ends of the rotatable portions 130, 132 and is secured by an appropriate latch 134 when extended so as to span the rotatable portions 130,132. In operation, release of the latch 134 and sliding of the central portion 128 so that it telescopes or moves laterally relative to one of the rotatable portions 130, 132, enables the rotatable portions to be released to pivot as illustrated by arrows 136 to open the entire central area of the seating module 106. Various other handle arrangements can be envisioned which would permit convenient entrance and exit to and from the seating area of the seating module while still leaving the central area of the seating module unencumbered for receiving the front portion of a similar cart for nesting purposes.

Although described with respect to various preferred embodiments of the invention, it should be readily understood that various changes and/or modification can be made to the invention as described without departing from the spirit thereof, and the invention is only intended to be limited by the scope of the following claims.

What is claimed is:

1. A multiple child seat nestable shopping cart comprising:
 a wheeled chassis having a longitudinally extending central area which extends along a centerline in a lengthwise direction of the wheeled chassis;
 a shopping cart basket mounted on the chassis, the basket including a front nesting portion, outer side portions, and a rear portion;
 at least two child seats facing inwardly towards the longitudinally extending central area positioned behind the basket rear portion on opposite sides of the cart and supported by the wheeled chassis;
 said seats positioned dimensioned and configured so as to be capable of receiving a front nesting portion of a similar cart basket over the seats when the seats are unoccupied.

2. The shopping cart as claimed in claim 1, wherein each seat has an upright backrest, and wherein said backrests are positioned dimensioned and configured so as to be capable of receiving a front nesting portion of a similar cart basket between the backrests when the seats are unoccupied.

3. The shopping cart as claimed in claim 2, wherein said seats are spaced apart from each other along the cart length.

4. The shopping cart as claimed in claim 1 further comprising a floor extending between opposite sides of the cart in front of and between said two seats.

5. A nestable shopping cart and child seat, comprising:
 a wheeled basket module including a forwardly projecting basket having a front nestable portion;
 a wheeled seat module having a longitudinal central area extending along a centerline in a lengthwise direction of said wheeled seat module and arranged behind the basket module and including at least a first child adapted to support at least one child passenger on the module in an upright position and facing sideways towards the central area such that the child's legs can be arranged substantially inside the cart; and
 a rear area in the seating module arranged for receiving at least a front nestable portion of a basket of another similar shopping cart over the first seat when the seat is unoccupied, said first seat being located, dimensioned and configured so that a front nestable portion of a basket of another similar cart may pass thereover in a nested relationship.

6. A nestable shopping cart and child seat as claimed in claim 5, wherein a back edge of said first child seat is arranged along a lateral side of said seat module.

7. A nestable shopping cart and child seat as claimed in claim 6, wherein said first child seat further includes a backrest arranged along said back edge of the first child seat.

8. A nestable shopping cart and child seat as claimed in claim 5, wherein said wheeled seat module further comprises a second child seat adapted to support another child upright and facing sideways towards the central area with the child's legs arranged substantially inside the cart, said second seat being located, dimensioned and configured so that a front nestable portion of a basket of another similar cart may pass thereover in a nested relationship when the seats are unoccupied.

9. A nestable shopping cart and child seat as claimed in claim 8, wherein said seats are located towards opposite lateral sides of the seat module and wherein each of said seats includes a backrest arranged along a lateral side of said seat module, said backrests being located, dimensioned and configured so that a front nestable portion of a basket of another similar cart may pass therebetween in nested relationship.

10. A nestable shopping cart and child seat as claimed in claim 5, including a connector rigidly connecting the basket module to the seat module for wheeled movement together.

11. A nestable shopping cart and child seat as claimed in claim 10, wherein said basket module includes a basket module chassis and said seat module includes a separate seat module chassis, said connector means comprising a connector assembly removably connecting the basket module chassis with the seat module chassis.

12. A nestable shopping cart and child seat as claimed in claim 11, wherein said connector assembly further comprises:
a plate;
at least one stud having one end secured to the plate and another end secured to said seating module chassis;
at least one bracket for securing the plate to the shopping cart chassis; and
said stud and bracket including threads for being secured with a nut.

13. A multiple child seat nestable shopping cart, comprising:
a wheeled shopping cart having a frontward overhanging basket;
a wheeled seating module fastened to the cart behind the basket and having a longitudinally extending central area extending along a centerline in a lengthwise direction of said wheeled seat module, said seating module having a floor and at least two spaced-apart seats facing inwardly towards the central area and arranged on opposite sides of the seating module, each of the seats having a backrest arranged along an opposite side of the seating module; and
said seats located, dimensioned and configured so as to permit a forward overhanging portion of a basket of a similar shopping cart to pass over the seats and between the backrests for nesting.

14. A shopping cart as claimed in claim 13, further comprising a connector assembly for securing said shopping cart to said seating module for wheeled movement together.

15. A multiple child seat nestable shopping cart as claimed in claim 1 or 13, including a cart maneuvering handle arrangement located towards a rear area of the cart selected from the group consisting of a handle spanning the rear cart area, individual unconnected gripping devices and pivotally mounted handle portions connectable by a central portion spanning the pivotally mounted portions.

16. A multiple child seat nestable shopping cart as claimed in claim 1 or 13, including a handle device for maneuvering the cart located at a rear area of the cart rearward of the seats relative to a forward direction of motion of the cart; said handle device arranged to permit access to the seats by a child from the rear area of the cart and to avoid interference with nesting within the cart rear area by a front nesting portion of a similar cart basket.

17. A seat module for use with a wheeled shopping cart comprising:
a longitudinally extending seat body having a forward end and a rearward end; a longitudinally extending central area extending along a centerline of said longitudinally extending seat body from the forward to the rearward end of said longitudinally extending seat body, and at least one molded plastic child seat facing transversely inwardly towards the central area, the seat including an upright backrest extending parallel with the longitudinally extending central area, a generally horizontal seat surface on one side of the central area and a floor surface area in front of and below the seat surface extending from an area adjacent the forward end to an area located towards the rearward end;
a handle device located towards a rearward end of the seat body, the handle device being arranged to avoid interference with nesting within the seat module rear area of a front nesting portion of a shopping cart basket; and
wheels connected to and supporting the rearward end area only of the seat body relative to a support surface, whereby the forward end of the seat body is unsupported relative to such support surface.

18. A seat module as claimed in claim 17, wherein said wheels are castered.

19. A seat module as claimed in claim 17, including a second molded plastic child seat facing transversely inwardly towards the central area, said second seat including an upright backrest, a generally horizontal seat surface on the side of the central area that is opposite the side on which the first recited seat is located, said floor surface area extending to a location in front of and below said second seat.

20. A seat module as claimed in claim 19, wherein said seats are longitudinally spaced apart.

21. A seat module as claimed in claim 20, wherein said seats, backrests and floor area are all molded as a single piece.

22. A seat module as claimed in claim 19, wherein the at least one molded plastic child seat has a seat edge which extends beyond a seat edge of the second plastic child seat face.

23. A seat module as claimed in claim 19, wherein the at least one molded plastic child seat and the second plastic child seat are offset from one another.

24. A seat module as claimed in claim 19, wherein the support surface is positioned in front of and to the side of the at least one molded plastic child seat and the second plastic child seat face.

25. A seat module as claimed in claim 17, wherein said handle device is a maneuvering handle arrangement selected from the group consisting of a handle spanning the rear area, individual unconnected gripping devices and pivotally mounted handle portions connected by a central portion spanning the pivotally mounted portions.

26. A seat module as claimed in claim 17, wherein said handle device is used for maneuvering the module relative to a forward direction of motion of the module, said handle device arranged to permit access to the seats by a child from the rear area of the module.

* * * * *